77-153
3/14/86 RE 32,264

United States Patent [19]

Bonafous

[11] E Patent Number: Re. 32,264

[45] Reissued Date of Patent: Oct. 14, 1986

[54] DOUBLE TORIC SEALING RING

[75] Inventor: Maurice Bonafous, Oloron, France

[73] Assignee: Applications Mechaniques et Robinetterie Industrielle (AMRI S.A.), France

[21] Appl. No.: 795,646

[22] Filed: Nov. 6, 1985

Related U.S. Patent Documents

Reissue of:

[64] Patent No.: 4,415,170
Issued: Nov. 15, 1983
Appl. No.: 337,279
Filed: Jan. 5, 1982

[30] Foreign Application Priority Data

Jan. 13, 1981 [FR] France ..... 81 00460

[51] Int. Cl.[4] ..... F16J 15/12; F16J 15/32

[52] U.S. Cl. ..... 277/163; 277/188 R; 277/198; 251/306

[58] Field of Search ..... 277/12, 32, 152, 153, 277/157, 163, 167.5, 188 R, 188 A, 198, 236; 251/306

[56] References Cited

U.S. PATENT DOCUMENTS

| | | | |
|---|---|---|---|
| 3,356,336 | 12/1967 | Maenaka | 251/306 |
| 3,706,482 | 12/1972 | Crockett | 277/32 X |
| 3,879,043 | 4/1975 | Tozer | 277/163 |
| 3,917,294 | 11/1975 | Abbes et al. | 277/236 X |
| 4,132,399 | 1/1979 | Lechanu et al. | 277/198 X |
| 4,194,749 | 3/1980 | Bonafous | 277/163 |

FOREIGN PATENT DOCUMENTS

| | | | |
|---|---|---|---|
| 2119258 | 8/1972 | France | 277/198 |

*Primary Examiner*—Robert S. Ward
*Attorney, Agent, or Firm*—Vinson & Elkins

[57] ABSTRACT

A flexible double toric sealing ring comprising two toric sealing ring structures 2, 3 which ensure, respectively, a static seal and a dynamic seal. A counter ring is mounted radially on the second sealing ring structure and floats with it to allow self centering of the arrangement with respect to the valve seat. A sealing membrane 8 presents an elastically deformable structure 12 interconnecting the two sealing ring structures 2 and 3 while partially covering them. The two sealing ring structures 2, 3 are mounted on opposite sides of the middle section 11 of membrane 8. This double toric sealing ring can be advantageously applied to a butterfly valve.

10 Claims, 4 Drawing Figures

DOUBLE TORIC SEALING RING

Matter enclosed in heavy brackets [ ] appears in the original patent but forms no part of this reissue specification; matter printed in italics indicates the additions made by reissue.

BACKGROUND OF THE INVENTION

The present invention concerns an improvement on a double toric sealing ring analogous to the one described in French Pat. No. 2,398,940, filed on July 26, 1977. It is constructed of two toric sealing ring structures interconnected by a resilient membrane. The two sealing ring structures, one ensures a static seal and the other a dynamic seal, produce an upstream/downstream seal in a valve.

The double toric sealing ring comprises a counter ring mounted on the toric sealing ring structure that ensures a dynamic seal. In particular, the counter ring absorbs the compression forces at the valve seat, for example, at a groove in a butterfly closure member in the case of a butterfly valve, and equally distributes contact pressure along the circumference (thereby resulting in self-centering of the sealing ring structure). This counter ring is mounted radially on the sealing ring structure to ensure a dynamic seal, and floats with it to allow self-centering of the sealing ring structure on the sealing surface of the butterfly closure member.

In the embodiment described in the French Pat. No. 2,398,940, the aforesaid flexible membrane consists of a toric part whose section of revolution has a general C shape, the ends of which wrap around the two sealing ring structures, and a middle section which has a V-shaped fold. The two sealing ring structures are tangentially located on opposite sides of the V-shaped fold.

The precedingly defined double ring obtains excellent results, particularly in the case of shut-off valves, such as butterfly valves.

In this last application, the double ring is placed in an annular cavity formed between the side face of the butterfly valve body and a flange attached to the side by bolts. This cavity opens into the inner chamber of the valve body.

The base of the cavity comprises an annular groove formed by a step of the bore of the flange and by the side face of the valve body. This groove receives the first toric sealing ring structure and combines with it to form a first static seal, the sealing pressure being obtained by the tightening of the aforesaid flange on the valve body by means of the aforesaid bolts.

On the side face of the valve body is a circular groove in which the V-shaped fold of the aforesaid membrane is positioned.

Such an arrangement notably requires on one part, the formation of a relatively complex flange, fixed on the valve body, and on the other part, machine finishing of the side face of the valve.

SUMMARY OF THE INVENTION

Therefore, the invention has for its object the provision of a double toric sealing ring structure which utilizes a principle identical to the one described in French Pat. No. 2,398,940, dated July 26, 1977, but in a manner which considerably simplifies the formation or manufactures of the fixed parts.

To obtain these results, the double toric sealing ring structure comprises, in the manner of claim 1 of French Pat. No. 2,398,940, first and second toric sealing rings structures which ensure respectively, a static seal and dynamic seal, a counter ring which absorbs the compressive forces at the valve seat and distributes contact pressure equally along the circumference, with the counter ring being movably mounted around the second sealing ring structure to allow self-centering of the sealing ring structure on the valve seat, and a sealing membrane, having an elastically deformable section which interconnects the two sealing ring structures while partially covering them, the aforesaid double toric sealing ring being characterized by the placement of the two sealing ring structures on opposite sides of the middle section of the membrane.

According to one embodiment of the present invention, the aforesaid membrane has a general S-shaped cross-section with a middle section, in a semi-circular form or shape of a U, which partially promotes the elastically deformable quality of the membrane allowing self-centering of the second sealing ring structure.

Also, the subject invention provides a simplified mounting of a double sealing ring structure in a shut-off valve, such as a butterfly valve including, first, a body comprising a central passage provided with one or more protuberances, one side having a conical face, and the other side having a steep face which is preferably perpendicular to the axis of the passage, and, secondly, a closure member, for example, a butterfly closure member pivotally mounted in the aforesaid body and the sealing surface of which closes against the second sealing ring structure at the end of the closure movement, after a movement tangential to or parallel to the main axis of symmetry of the aforesaid valve seat.

It should be noted that the teachings of the present invention are equally applicable to the possibility of a mounting inverse to the one previously described.

In such an inverse mounting, the valve seat consists of a conical surface formed in the passage of the valve body, and the double toric flexible sealing ring structure is mounted on the same level as the groove of the butterfly.

According to another characteristic of the present invention, the aforesaid arrangement comprises first, two annular grooves in the aforesaid steep face, one groove having oblique inner side walls, and functioning to receive the first sealing ring structure, and the other groove engaging the U-shaped middle section of the elastic sealing membrane, and secondly, an annular part with an exterior diameter substantially equal to the inner diameter of the valve passage or opening of the valve body, said annular part being associated with the steep face side of the aforesaid body and presenting on one side a stepped face with at least two surface levels, of which one of the surfaces, in the form of a crown, serves to compress the first toric sealing ring structure, and of which the second surface along with the aforesaid steep face forms an annular cavity in which a floating counter ring is movably mounted along with the second sealing ring structure. The crowned surface of the annular part also exerts an axial force in the direction of the aforesaid steep face to compress the first sealing ring structure to obtain the aforesaid static seal.

BRIEF DESCRIPTION OF THE DRAWINGS

Some embodiments of the invention will be described hereafter, as illustrative embodiments, with reference to the annexed drawings in which.

DETAILED DESCRIPTION OF THE DRAWINGS

Figure 1:
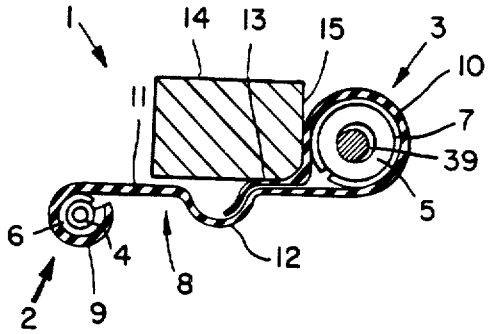
FIG. 1 is a transverse sectional view of a double flexible toric sealing ring with a counter ring.

As previously mentioned, the double toric sealing ring 1 pursuant to the present invention comprises two sealing ring structures 2, 3, each comprising a helical spring 4, 5 at least partly covered by a primary casing 6, 7 having a substantially circular cross section, the toric sealing ring structure 2 functioning to ensure a static seal and the toric sealing ring structure 3 functioning to ensure a dynamic seal.

These two sealing ring structures are interconnected by a sealing membrane 8 formed in the shape of a toric part with a substantially S-shaped cross section, the ends of which partially wrap around the two sealing ring structures 2, 3 to form sealing casings. The middle section 11 of the aforesaid membrane has a semi-circular form 12 which is the elastic element that ensures flexibility and self-centering of the sealing ring structure 3.

Figure 2:
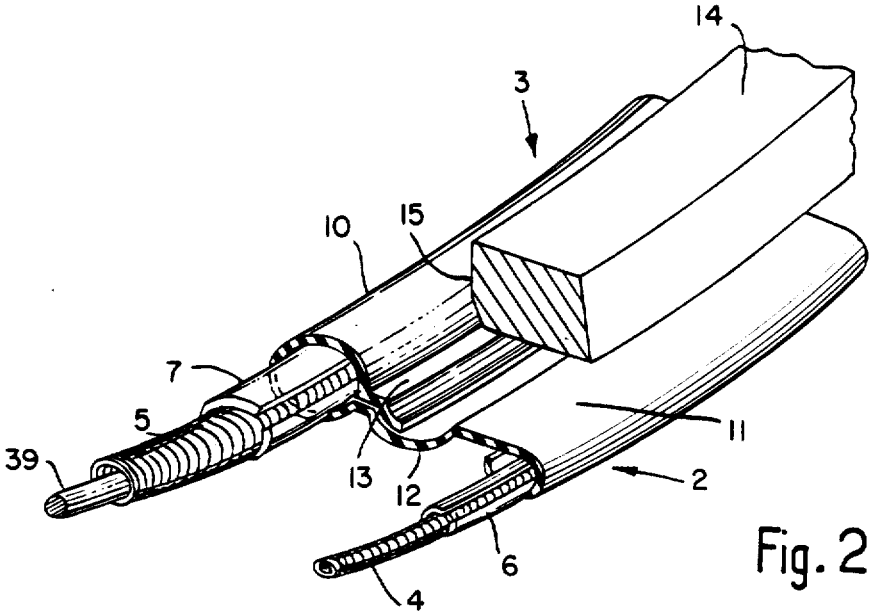
FIG. 2 is a diagrammatic perspective view, with parts cut away, of the double toric sealing ring represented in FIG. 1.

In the embodiments shown in FIGS. 1 and 2, the sealing membrane 8 envelops sealing ring structure 3 and forms a double layer (portion 13) at the middle section 11.

The counter ring 14, formed with a generally rectangular sectional shape, supports on its internal cylindrical face 15 the sealing ring structure 3.

Thus, the sealing ring structure 3 is restrained, on the side opposite to that contacting the valve seat, by the counter ring 14. The arrangement of sealing ring structure 3 and counter ring 14 is displaced as a unit for self-centering on the valve seat sealing surface.

Figure 3:
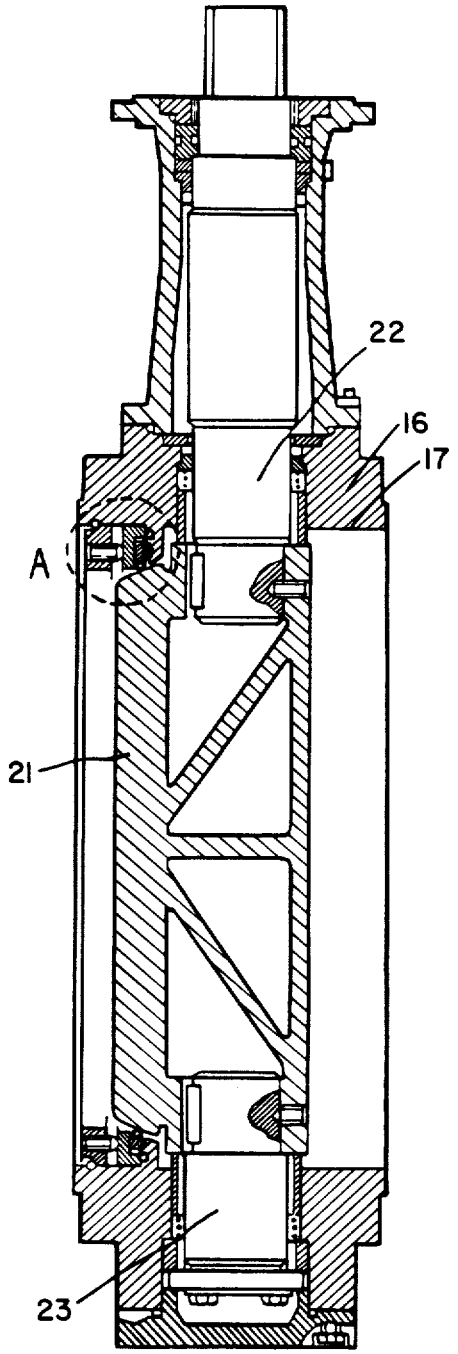
FIG. 3 is an axial sectional view of a butterfly valve equipped with a double toric sealing ring structure, positioned in the body of the valve.
Figure 4:
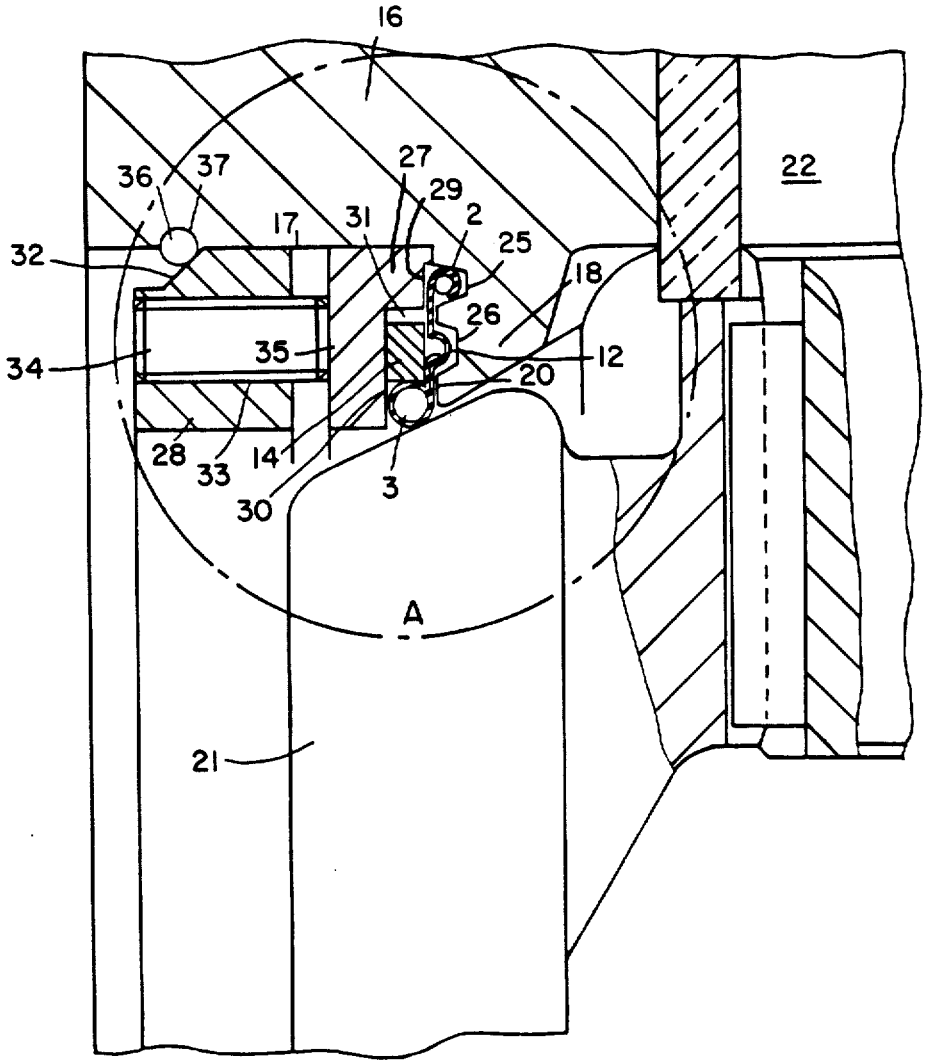
FIG. 4 is a partial sectional view, on an enlarged scale, of the detail A of of FIG. 3.

With reference to FIGS. 3 and 4, the butterfly valve, in which the aforedescribed double toric sealing ring structure is mounted, comprises:

first, a valve body 16 having a central valve passage or opening 17 provided with an inwardly projecting protuberance 18 which has a steep face 20 in a plane perpendicular to the axis of passage 17, and secondly, a butterfly closure member 21, pivotally mounted in the aforesaid body 16 (on shafts 22, 23), which bears against the sealing ring structure 3 at the end of the valve closure movement, after a movement tangential to or parallel to the main axis of symmetry of the valve seat.

On the steep face 20 of protuberance 18 are two coaxial circular grooves, a groove 25 having oblique side walls forming a conical section for receiving the sealing ring structure 2, and a groove for receiving the semi-circular form 12 of the sealing membrane 8.

These two co-axial circular grooves have different functions:

the groove 25 with a conical section for receiving the static sealing structure must be formed with precision as it receives the semi-circular elastic element;

the groove 26 which receives the semi-circular form 12 of the membrane 8 does not require precision machine-finishing (it being important to allow freedom of movement or play of the elastic element).

The passage 17 of the valve body 16 and the steep face side 20 successively associate with an annular part 27 which functions to retain the double sealing ring structure 1, along with a fastening member 28 having an exterior diameter approximately equal to the inner diameter of the aforesaid passage 17.

The annular part 27 has a general L section shape, and has on the side associated with the aforesaid steep face 20 a frontal face with two steps, of which one of the surfaces 29, in the form of a crown, functions to restrain the sealing ring structure 2, and of which the other surface 30 along with the steep face 20 defines an annular cavity 31 in which is positioned the counter ring 14 and the sealing ring structure 3 which is resiliently mounted at the exterior of the aforesaid cavity 31.

The fastening member 28 has a substantially rectangular shape, and an angular edge 32 adjacent to the passage 17 of valve body 16, and situated on the side opposite to the steep face 20, is beveled. This fastener 28 has a series of threaded bores parallel to its own axis of symmetry and uniformly distributed therearound. Screws 34 are threadably mounted in these bores 33. The flat ends of these screws contact the frontal face 35 of annular part 27, on the side opposite to the stepped face 29, 30. The fastener 28 is axially retained by bevel edge 32 by means of a retaining ring 36 engaged in a groove 37 formed in the passage 17 of the valve body 16.

The annular part 27 is tightened against the steep face 20 of the protuberance by a tightening of the screws 34. It is observed that this tightening causes compression of sealing ring structure 2 in its groove 25. It is also observed that the tightening effort of static sealing ring structure 2 is lessened by reason of the conical form of the groove 25, provided in the body 1, and that this arrangement also presents the advantage of providing a double seal (a seal on each oblique face).

It is acknowledged that in addition to the advantages previously mentioned, the particular configuration of the double toric sealing ring structure 1 prevents the membrane 8, enveloping sealing ring structure 3, from unraveling.

In effect, the counter ring 14 prevents any sliding of the doubled part 13 of the membrane 8 in the middle section 11.

The aforedescribed double toric sealing ring obtains excellent results at high and low service temperatures. In this case, as well as for numerous other applications, the double structure can be entirely metallic. Thus, the helical springs 4, 5 can be constructed of "INCONEL" and the primary casings 6, 7 and the sealing membrane 8 can be constructed of copper. Furthermore, the dynamic sealing ring structure 3 contains, in the interior of its helical spring, a ring 39 limiting compression of the aforesaid structure 3. The aforesaid ring may be constructed of stainless steel.

What is claimed is:

1. A flexible double toric sealing ring comprising first and second sealing ring structures 2, 3, positioned about a common concentric axis, which ensure respectively a static seal and a dynamic seal, a counter ring which absorbs the compressive forces at the valve seat and also distributes contact pressure along the circumference, said counter ring movably mounted around the second sealing ring structure to allow self-centering of the sealing ring structure on the valve seat, and a sealing membrane, having an elastically deformable part, which interconnects the two sealing ring structures while partially covering them, said double toric sealing ring being characterized by said sealing membrane having one lateral side facing in a first direction along said common concentric axis and having an opposite lateral side facing in a second direction, opposite said first direction, along said common concentric axis, and by the placement of the two sealing ring structures on opposite lateral sides of the middle section of the membrane.

2. A flexible double toric sealing ring comprising first and second sealing ring structures 2, 3, which ensure respectively a static seal and a dynamic seal, a counter ring which absorbs the compressive forces at the valve seat and also distributes contact pressure along the circumference, said counter ring movably mounted around the second sealing ring structure to allow self-centering of the sealing ring structure on the valve seat, and a sealing membrane, having an elastically deformable part, which interconnects the two sealing ring structures while partially covering them, said double toric sealing ring being characterized in that said membrane 8 has a general S shape with a middle section, said middle section having a semi-circular form 12 which partially promotes the elastically deformable quality of the membrane 8, and further characterized by the placement of the two sealing ring structures on opposite sides of the middle section of the membrane.

3. A flexible double toric sealing ring according to claim 2, characterized in that the membrane 8 envelops sealing structure 3 and forms a partial double layer at the middle section of said membrane 8.

4. A flexible double toric sealing ring according to claim 1, constructed at least partially of metal.

5. A flexible double toric sealing ring according to claim 1, mounted in a butterfly valve.

6. A simplified mounting of a double toric sealing ring according to claim 2, in a butterfly valve comprising, first, a body 16 having a central passage 17 having one or more protuberances 18, one side having a steep face 20 which is preferably perpendicular to the axis of the aforesaid passage 17, and secondly, a butterfly closure member 21 pivotally mounted in said body which closes against the sealing ring structure 3 at the end of the closure movement, after a movement tangential to or parallel to the main axis of symmetry of the valve seat, characterized in that it comprises:

first and second annular grooves in the said steep face 20, a first groove 25 having oblique inner side walls for receiving the first sealing ring structure 2, and a second groove 26 for receiving the semi-circular form 12 at the sealing membrane 8, and an annular part 27 with an exterior diameter substantially equal to the diameter of the passage 17 of body 16, the side of said annular part associated with the steep face 20 functioning to restrain the first sealing ring structure 2, and forming with said steep face 20 an annular cavity 31 in which the counter ring 14 is mounted along with the second sealing ring structure 3, and a retaining member for exerting on said annular part an axial force in the direction of the said steep face 20, and for retaining it in position in the passage 17 of body 16.

7. A flexible double toric sealing ring according to claim 1, characterized in that the membrane 8 envelops sealing ring structure 3 and forms a partial double layer at the middle section of said membrane 8.

8. A simplified mounting of a double toric sealing ring according to claim 1, in a butterfly valve comprising, first, a body 16 having a central passage 17 having one or more protuberances 18, one side having a steep face 20 which is preferably perpendicular to the axis of the aforesaid passage 17, and secondly, a butterfly closure member 21 pivotally mounted in said body which closes against the sealing ring structure 3 at the end of the closure movement, after a movement tangential to or parallel to the main axis of symmetry of the valve seat, characterized in that it comprises:

first and second annular grooves in the said steep face 20, a first groove 25 having oblique inner side walls for receiving the first sealing ring structure 2, and a second groove 26 for receiving the semi-circular form 12 at the sealing membrane 8, and an annular part 27 with an exterior diameter substantially equal to the diameter of the passage 17 of body 16, the side of said annular part associated with the steep face 20 functioning to restrain the first sealing ring structure 2, and forming with said steep face 20 an annular cavity 31 in which the counter ring 14 is mounted along with the second sealing ring structure 3, and a retaining member for exerting on said annular part an axial force in the direction of the said steep face 20, and for retaining it in position in the passage 17 of body 16.

*9. A butterfly valve comprising, body means 16, flow passage means 17 through the body means, protuberance means 18 on said body means projecting inwardly into said flow passage means, seal ring means 2, 3 in said flow passage means 17 and engaging said protuberance means 18, butterfly closure means 21 engageable with said seal means 2,3 to control flow through said body means 16, annular part means 27 in said flow passage means 17 engaging said sealing ring means 2, 3, annular fastening means 28 in said flow passage means 17 adjacent said annular part means 27, retainer ring means 36 releasably secured to said body in said passageway means, expander means 34 extending between said annular part means 27 and said fastening means 28 and when expanded forcing said fastening means 28 against said retainer ring means 36 and said annular part means 27 against said seal ring 2, 3 to hold said seal ring means 2, 3 in engagement with said protuberance means.*

*10. The valve of claim 9 wherein said expander means 34 is provided by screws threaded in said fastening means 28 and bearing against said annular part means 27.*

* * * * *